United States Patent

Wisser et al.

[11] Patent Number: 6,062,784
[45] Date of Patent: May 16, 2000

[54] SPREADING ANCHOR

[75] Inventors: Erich Wisser, Bregenz, Austria; Markus Hartmann, Mauerstetten, Germany; Kai-Uwe Keller, Feldkirch-Tisis; Matthias Blessing, Feldkirch-Tosters, both of Austria

[73] Assignee: Hilti Aktiengesellschaft, Schaan, Liechtenstein

[21] Appl. No.: 09/153,915

[22] Filed: Sep. 16, 1998

[30] Foreign Application Priority Data

Sep. 17, 1997 [DE] Germany ............................ 197 40 823

[51] Int. Cl.[7] ............................ F16B 13/06; F16B 37/08; F16B 39/36

[52] U.S. Cl. .......................... 411/267; 411/57.1; 411/270; 411/433

[58] Field of Search .................................. 411/55, 57, 60, 411/61, 63, 64, 65, 267, 270, 433, 57.1

[56] References Cited

U.S. PATENT DOCUMENTS

| | | | |
|---|---|---|---|
| 4,865,246 | 9/1989 | Miyanaga | 411/60 X |
| 5,324,150 | 6/1994 | Fullerton | 411/267 X |
| 5,340,252 | 8/1994 | Weddendorf | 411/267 |
| 5,846,041 | 12/1998 | Bevan et al. | 411/65 |

*Primary Examiner*—Neill Wilson
*Attorney, Agent, or Firm*—Brown & Wood, LLP

[57] ABSTRACT

A spreading anchor including a sleeve (2) having an expansion region (3) provided with longitudinal slots (4), and an axial bore (5) having a conical shape in the expansion region (3) conically tapering toward a rear, with respect to a setting direction (5) end (6) of the sleeve (2), and a spreading member (8) having a conical profile at least along a portion of its longitudinal extent and displaceable in the axial bore (5) upon radial expansion of the sleeve expansion region (3), the spreading member (8) having a cylindrical through-bore (9) and being formed of tensioning segments (11–14) which extend in an axial direction and are held together with a possibility of a radial resilient expansion.

9 Claims, 1 Drawing Sheet

SPREADING ANCHOR

BACKGROUND OF THE INVENTION

1. Field of the Invention

The present invention relates to a spreading anchor including a sleeve having an expansion region provided with longitudinal slots and an axial bore having a conical shape in the expansion region of the sleeve, and a spreading member having a conical profile at least along a portion of its longitudinal extent and displaceable in the axial bore upon radial expansion of the sleeve expansion region.

2. Description of the Prior Art

A conventional multiple-use spreading anchor of the above-described type, which is known for a long time, includes, as discussed above, an expansion sleeve having an expansion region and a conical axial bore in the expansion region, and a mostly conical spreading member which is displaceable in the axial bore of the sleeve upon a radial expansion of the expansion region of the expansion sleeve. In this known spreading anchor, the axial bore of the expansion sleeve has its diameter reduced to the front, with respect to the setting direction, end of the expansion sleeve. The spreading member is driven into the conical section of the axial bore of the expansion sleeve by axial impacts thereon. The expansion sleeve is anchored in the bore upon a radial expansion of the expansion region. According to one embodiment of the conventional spreading anchor, the axial bores expands conically toward the sleeve front end, and the spreading member is held at the front end of the sleeve. For anchoring the spreading anchor in a bore, the sleeve is driven over the spreading member which is supported against the bore bottom. The sleeve expands while being driven over the spreading member. After the expansion sleeve has been anchored in the bore, an anchor rod, which serves for attachment of a constructional component, is connected with the sleeve. The expansion sleeve is provided, to this end, with an inner thread in the rear region of the axial bore. The anchor rod is provided with a corresponding outer thread.

For forming a connection with this spreading anchor, it is necessary first to anchor the expansion sleeve in the bore. Only then can an anchor rod or a threaded rod be screwed into the expansion sleeve for attaching a constructional component. At that, the inner thread provided in the rear end region of the expansion sleeve and the outer thread of the anchor rod must be matched with each other with regard to their diameters. If, e.g., the expansion sleeve has a metric inner thread with a particular diameter, only an anchor rod with a corresponding metric thread and a corresponding diameter can be attached to the sleeve. With this conventional spreading anchor, it is not possible to attach an anchor rod having, e.g., a British Standard Whitworth (B.S.W.) thread to an expansion sleeve having a metric thread. It is also not possible to use, with this conventional spreading anchor, conventional reinforced steel rods having a radial or thread-shaped profile formed on its outer surface.

According an object of the present invention is to provide a spreading anchor which would provide for a simple and quick formation of an attachment point. The anchoring of an expansion sleeve in a bore in a separate operational step before attachment of an anchor rod should not be any more necessary.

A further object of the present invention is to provide a spreading anchor which would create conditions for attachment of anchor rods having outer surfaces with differently shaped profiles. The spreading anchor should also have a certain allowance for a spread of outer diameters of the attachable anchor rods. The spreading anchor should also have a secondary expansion capability to insure an adequate anchoring in case of crevices in the structural component.

SUMMARY OF THE INVENTION

These and other objects of the present invention, which will become apparent hereinafter, are achieved by providing a spreading anchor including a sleeve having an expansion region provided with longitudinal slots and an axial bore having a conical shape in the expansion region. The axial bore tapers conically toward a rear, with respect to a settling direction, end of the sleeve. The anchor further includes a spreading member having a conical profile at least along a portion of its longitudinal extent and displaceable in the axial bore upon radial expansion of the sleeve expansion region. The spreading member has a cylindrical through-bore and is formed of tensioning segments which extend in an axial direction and are held together with a possibility of a radial resilient expansion.

The cooperation of a spreading member, which is formed of a plurality of separate tensioning segments, which are held together with a possibility of a resilient radial expansion, and which has a central bore, and an expansion sleeve the axial bore of which narrows toward the sleeve rear end, provides for simultaneous anchoring of the spreading anchor in a bore of a structural component and attachment of an anchor rod. The expansion sleeve need only be pushed into the bore of the structural component. Anchoring is effected simultaneously with attachment of the anchor rod, with the anchor rod being driven into the through-bore of the spreading member and with attachment being effected upon application of a tensioning load. When the anchor rod is driven in, the tensioning segments of the spreading member expand radially. They are pressed, upon expanding, against the outer surface of the anchor rod and hold it as a result of a force-locking, and, if necessary, form-locking connection. Under a tensioning load, the conically-shaped spreading member is pulled into the conically narrowing axial bore of the sleeve, and the tensioning segments further are pressed against the outer surface of the anchor rod. This further increases force-and/or form-locking connection of the spreading anchor with the anchor rod. Simultaneously, the displacement of the spreading member in the axial bore of the expansion sleeve expands the sleeve expansion region whereby the spreading anchor is anchored in the bore of the structural component.

The spreading member, which is formed of resiliently radially expanding, tensioning components, provides for a certain spread of diameters of the anchor rods. Thus, anchor rods can be used the diameter of which exceeds up to 10% the nominal connection diameter of the spreading anchor. The construction of the spreading anchor according to the present invention creates condition for insertion of anchor rods with a different shape of the outer surface. Thus, it is possible to use anchor rods having a metric thread, B.S.W. thread or rods formed of a reinforced steel and having a radial or screw-shaped profile of the outer surfaces.

A particularly simple way to hold the plurality of tensioning segments together is to hold them with at least one elastic O-ring extending in the grooves formed in outer surface of the spreading member.

It is advantageous from a symmetrical point of view, to form the spreading body from at least four tensioning segments which are radially expandable against a resilient force of a holding member. For improving the setting of the anchor rod, there is provided on the inner surfaces of the tensioning segments means which form a form-locking connection with the contour of the anchor rod outer surface. In case the anchor rod has a thread-like contour, in particular when a threaded rod is used, a subsequent precise adjustment of the anchor rod becomes possible.

The means for forming the form-locking connection, which are provided on the inner surfaces of the tensioning segments, may be formed as a cover layer of a material which is weaker than the material of the anchor rod. The cover layer can be provided on at least a portion of the longitudinal extent of the tensioning segments.

In a simplified alternative embodiment of the present invention, the means for forming the form-locking connection can be formed as a shaped profile provided on the inner sides of the tensioning segments and inclined toward the axis of the spreading member, with the shaped profile extending at least along a portion of the longitudinal extent of the tensioning segments. Such profiling of the segments permits to insert anchor rods having different profiles of the outer surface. A particular advantageous holding value is obtained when the inner surfaces of the tensioning segments are provided with a thread-like profile. Thereby, the threaded rod, which have different types of threads, can form a form-locking connection with the segments, with the shaped profiles of the outer surface of the anchor rod and of the segments inner surfaces forming a form-locking connection in different regions the longitudinal extent of the tensioning segments. Threaded rods, the thread of which corresponds to the threaded profile formed on the inner surfaces of the tensioning segments, are easily height-adjustable by screwing the threaded rod into the spreading member a different length.

According to an advantageous embodiment of the present invention, the inner surfaces of the adjacent tensioning segments are provided with threads of different types. In case when the spreading member is formed of four tensioning segments, e.g., two, diagonally opposite segments can be provided with a metric thread, while the other two segments, which lie opposite each other, can be provided with a B.S.W. thread. When a anchor rod having a metric thread is used, it forms a form-locking connection with the two segments likewise provided with the metric thread. When the anchor rod having a B.S.W. thread is used, it forms a form-locking connection with another pair of segments. In both cases, the other pair of segments having a different thread enhances the form-locking connection as they two form a form-locking connection in those section of their longitudinal extent in which a certain correspondence of the profiles exists. Further, in both cases when either an anchor rod with a metric thread or an anchor rod with a B.S.W. thread is used, the rod is easily height-adjustable.

In an alternative embodiment of the present invention, the shaped profile on the inner surfaces or sides of the segments can comprise cutters the material of which is harder than that of the anchor rod. When a tensioning load is applied, the cutters cut into the outer surface of the anchor rod, forming a form-locking connection. When the cutters are arranged along helice on the inner surfaces of the segments, the cutters engage into the outer surface of the rod also along a helice. This provides for height adjustment of the anchor rod whether it can be screwed into the spreading member to a greater or lesser extent.

To insure a certain preliminary fixing of the anchor in a bore, the sleeve is provided, at least in its expansion region with cutter-like projections which, preferably, projects outwardly from the outer surface of the sleeve and which have a ring-shaped contour. This permits an overhead setting of the spreading anchor. On the other hand, upon the expansion region of the sleeve being expanded, the annular projections, which may be formed as annular cutters, engage into the bore wall and provide for an under pressure. This provides for a form-locking connection of the anchor sleeve and the bore wall.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENTS

Figure 1:
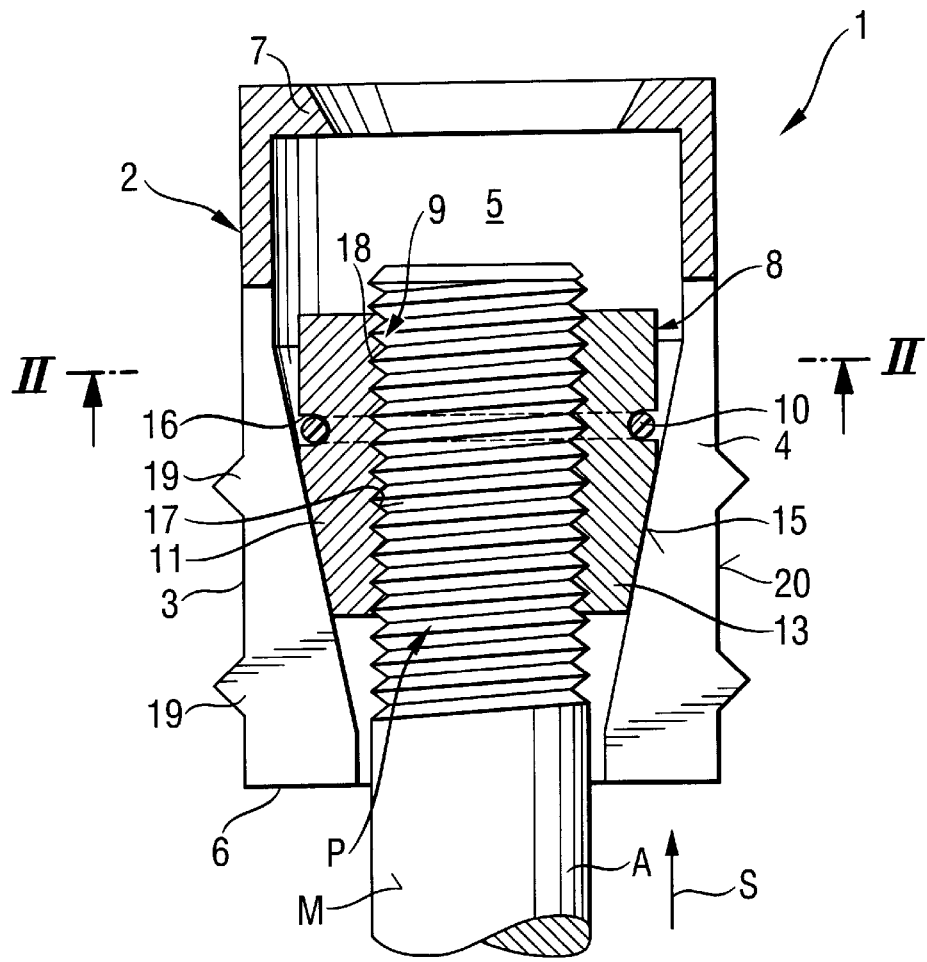
FIG. 1 shows an axial cross-sectional view of a spreading anchor according to the present invention with an inserted threaded rod.
Figure 2:
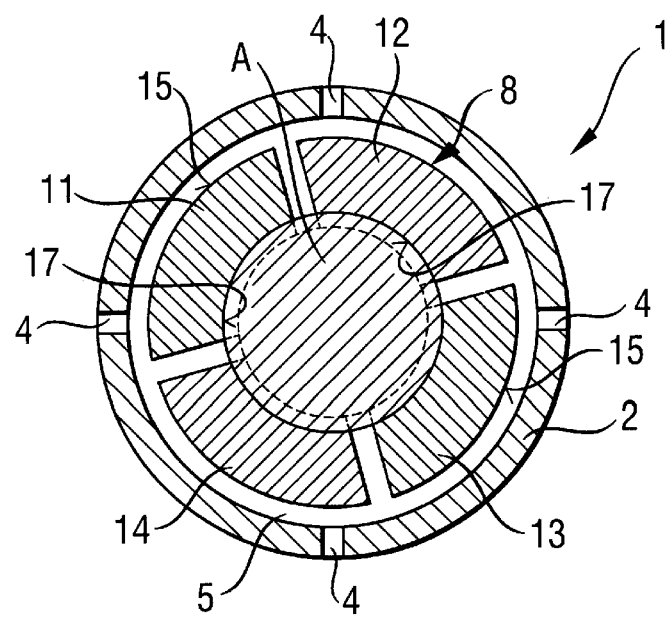
FIG. 2 is a cross-sectional view along line II—II in FIG. 1.

The spreading anchor according to the present invention, which is shown in FIGS. 1–2, is generally designated with a reference numeral 1. The spreading anchor 1 includes a sleeve 2 having an expansion region 3 provided with axial slots 4. The sleeve 2 has an axial bore 5 having a conically tapering section in the expansion region 3 of the sleeve 2. In the embodiment shown in the drawings, the expansion region 3 extends in the setting direction designated by arrow S, essentially over a trailing half of the sleeve 2, with the axial bore 5 tapering toward a rear end 6 of the sleeve 2. At the opposite, front end of the sleeve 2, there is provided an annular stop 7 which projects into the axial bore 5 of the sleeve 2 and narrows the bore 5. On the outer surface 20 of the sleeve 2, there are provided projections 19 which are shaped, preferably, as annular cutter edges and which projects radially outwardly from the surface 20 of the sleeve 2.

A spreading member 8 is arranged in the axial bore with a possibility of its axial displacement. The spreading member 8 has an outer conical profile along a portion of its longitudinal extent. The conical outer profile of the spreading member 8 has, preferably, a clonicity approaching so that of the conically tapering section of the axial bore 5 of the sleeve 2. The spreading member 8 has a through-bore 9 the inner diameter of which defines the nominal connection diameter of the spreading anchor 1. As shown in FIG. 2, the spreading member 8 is formed of four tensioning segments 11–14 which are held together with an O-ring 10 which extends in grooves 16 formed, respectively, in the outer surfaces 15 of the tensioning segments 11–14. The O-ring is elastically expandable. Thereby, the tensioning segments 11–14 are displaced radially upon driving-in of an anchor rod A. The largest outer diameter of the spreading member 8 in its cylindrical region is larger than the reduced inner diameter of the axial bore 5 which is reduced by stop 7 provided at the front end of the sleeve 2.

Inner sides 17 of the tensioning segments 11–14 have a shaped profile 18 which, preferably, is formed a thread-like profile. At that, e.g., two diagonally opposite tensioning segments 11 and 13 can be formed with a metric thread, while another pair of tensioning segments 12 and 14 can be formed with a British standard Whitworth (B.S.W.) thread. It should be understood that the inner sides 17 of all four tensioning segments 11–14 may have the same type of a thread or other shaped profile 18. The profile 18 can be formed as a cutting edge-like profile in order to emboss in the weaker outer surface M of the anchor rod A, a corresponding profile P during loading of the anchor rod A. Instead of a shaped profile 18, the inner sides 17 of the tensioning segments 11–14 can be formed with a coating which is weaker than the material of the anchor rod A. Thereby, upon loading of the anchor rod A, the profile P of the outer surface M will be embossed into the inner sides 17 of the tensioning segments 11–14.

To effect an attachment with the inventive spreading anchor 1, it is inserted into a bore formed in a structural component. The projections 19, which are formed as annular cutting edges on the outer surface 20 of the sleeve 2, insure a certain pre-fixing of the spreading anchor 1 in order to prevent its falling out of the bore, during an overhead mounting, for example. The anchoring of the spreading anchor 1 is effected with the anchor rod A when the latter is driven-into the through-bore 9 of the spreading member 8. Upon driving-in of the anchor rod A, which is formed with a shaped profile 18 on its outer surface M, the spreading member 8 is pushed against the stop 7. As soon as the spreading member 8 abuts the stop 7, the anchor rod A, upon being pushed further in the bore 9 of the spreading member 8 further ingresses into the spreading member 8. In the spreading member 8, as a result of an elastic radial yielding of the O-ring 10, the tensioning segments 11–14, which are held together with the O-ring 10, are loosen. Immediately after the anchor rod A reaches a predetermined circumference in the bore 9, it can be tension-loaded. The anchor rod A cannot fall out of the bore 9 of the spreading member 8 because the profile P of the anchor rod A and the profile 18 formed on the inner sides 17 of the tensioning segments 11–14 form a form-locking connection. Upon tension-loading of the anchor rod A, the conical section of the spreading member 8 is pulled into the conically tapering region of the axial bore 5 of the sleeve 2. At that, the tensioning segments 11–14 are further pressed against the outer surface M of the anchor rod A. Simultaneously with the spreading member 8 being pulled in the conically tapering region of the axial bore 5, the expansion region 3 of the sleeve 2 expands radially. The outer surface 20 of the sleeve 2 is pressed against the bore wall, and the cutting edge projections 19 form in the bore wall a formlocking underpressing. In this way, a force-locking anchoring of the sleeve 2 in a bore of a structural component is enhanced by a form-locking connection and, thereby, higher holding values are achieved.

The spreading anchor formed according to the present invention has a number of advantages. Forming the spreading member from a plurality of radially resiliently expanding tensioning segment presents a quick tying system for the anchor rod. After the spreading anchor is driven in the bore and a subsequent quick tying of the anchor rod, an immediate application of a load can follow. At that, the expansion region of the sleeve of the spreading anchor expands radially, and the spreading anchor is anchored in the bore. Further, the spreading anchor according to the present invention provides for a large flexibility in selecting of the insertible anchor rods. They later can have their profile be formed as a metric thread or a B.S.W. thread. Also, rods with appropriate reinforced cover layer of the outer surface and having radial or screw-shaped projection profile can be used. When anchor rods with a threaded profile are used, a high adjustability of the connection components is insured. Forming the spreading member from separate segments also permits to drive in anchor rods the outer-diameter of which exceeds the nominal connection diameter of the spreading anchor.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A spreading anchor, comprising a sleeve (2) having an expansion region (3) provided with longitudinal slots (4), and an axial bore (5) having a conical shape in the expansion region (3), the axial bore (5) conically tapering toward a rear, with respect to a setting direction (S), end (6) of the sleeve (2); a spreading member (8) having a conical profile at least along a portion of a longitudinal extent thereof and displaceable in the axial bore (5) upon radial expansion of the sleeve expansion region (3), the spreading member (8) having a cylindrical through-bore (9) and being formed of at least four separate tensioning segments (11–14) which extend in an axial direction; and means for holding the tensioning segments (11–14) together with a possibility of a radial resilient expansion thereof.

2. A spreading anchor according to claim 1, wherein the holding means comprises an O-ring (10) which is engaged in a radial groove (16) formed in an outer surface (15) of the tensioning segments (11–14).

3. A spreading anchor according to claim 1, wherein the sleeve (2) is provided, at least in the expansion region (3) thereof, with cutter-like projections (19).

4. A spreading anchor according to claim 3, wherein the cutter-like projections (19) are formed as an annular projection projecting outwardly from an outer surface (20) of the sleeve (2).

5. A spreading anchor, comprising a sleeve (2) having an expansion region (3) provided with longitudinal slots (4), and an axial bore (5) having a conical shape in the expansion region (3), the axial bore (5) conically tapering toward a rear, with respect to a setting direction (S) end (6) of the sleeve (2); a spreading member (8) having a conical profile at least along a portion of a longitudinal extent thereof and displaceable in the axial bore (5) upon radial expansion of the sleeve expansion region (3), the spreading member (8) having a cylindrical through-bore (9) and being formed of tensioning segments (11–14) which extend in an axial direction; and means for holding the tensioning segments (11–14) together with a possibility of a radial resilient expansion thereof;

wherein the tensioning segments (1–14) are provided, on inner sides (17) thereof, with means which forms with a shaped profile (P), which is provided on an outer surface (M) of an anchor rod (A), a form-locking connection, wherein the forming means comprises a shaped profile (18) formed on the inner sides (17) of the tensioning segments (11–14) and which is inclined toward an axis of the spreading member (8) and extends at least along a portion of length of the tensioning segments (11–14), and wherein the shaped profile (18), which is formed on the inner sides (17) of the tensioning segments (11–14), is formed as a cutting edge-like profile and is formed of a material which is harder than a material of an anchor rod (A).

6. A spreading anchor according to claim 5, wherein the shaped profile (18) is formed as a thread-like profile.

7. A spreading anchor according to claim 6, wherein the inner sides (17) of adjacent tensioning segments (11–14) have different threaded profiles.

8. A spreading anchor according to claim 7, wherein the inner sides (17) of the adjacent tensioning segments have, respectively, a metric thread-like profile and a B.S.W. thread-like profile.

9. A spreading anchor, comprising a sleeve (2) having an expansion region (3) provided with longitudinal slots (4), and an axial bore (5) having a conical shape in the expansion region (3), the axial bore (5) conically tapering toward a rear, with respect to a setting direction (S) end (6) of the sleeve (2); a spreading member (8) having a conical profile at least along a portion of a longitudinal extent thereof and displaceable in the axial bore (5) upon radial expansion of the sleeve expansion region (3), the spreading member (8) having a cylindrical through-bore (9) and being formed of tensioning segments (11–14) which extend in an axial direction; and means for holding tensioning segments (11–14) together with a possibility of a radial resilient expansion thereof, wherein the forming means comprises a covering layer, which is provided at least on a portion of a longitudinal extent of the inner side (17) of the tensioning segments (11–14) and which is formed of a material weaker than a material of the anchor rod, whereby upon tension loading of the anchor rod (A), embossing of the profile (P) of the outer surface (M) of the anchor rod (A) in the inner side (17) of the tensioning segments (11–14) becomes possible.

* * * * *